(12) United States Patent
Koch et al.

(10) Patent No.: US 11,207,735 B2
(45) Date of Patent: Dec. 28, 2021

(54) APPARATUS AND METHOD FOR THE ADDITIVE MANUFACTURING OF THREE-DIMENSIONAL STRUCTURES

(71) Applicant: Ford Global Technologies, LLC, Dearborn, MI (US)

(72) Inventors: Raphael Koch, Odenthal (DE); Lars Bognar, Dormagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 16/267,475

(22) Filed: Feb. 5, 2019

(65) Prior Publication Data

US 2019/0240732 A1    Aug. 8, 2019

(30) Foreign Application Priority Data

Feb. 7, 2018  (DE) .......................... 102018201901.0

(51) Int. Cl.
*B23K 26/34* (2014.01)
*B33Y 10/00* (2015.01)
(Continued)

(52) U.S. Cl.
CPC ............ *B22F 12/00* (2021.01); *B29C 64/153* (2017.08); *C04B 35/622* (2013.01); *B22F 10/10* (2021.01);
(Continued)

(58) Field of Classification Search
CPC ................... B33Y 10/00; B33Y 30/00; B23K 26/064–0652; B23K 26/34–342
See application file for complete search history.

(56) References Cited

U.S. PATENT DOCUMENTS

2013/0056910 A1   3/2013  Houbertz-Krauss et al.
2013/0122672 A1   5/2013  Or-Bach et al.
(Continued)

FOREIGN PATENT DOCUMENTS

CN        103071797        5/2013
CN        103949638        7/2014
(Continued)

OTHER PUBLICATIONS

Wiesner, et al., Multi-Laser Selective Laser Melting, Industrial Paper for 8th International Conference on Photonic Technologies LANE 2014, Pub. by Bayerisches Laserzentrum GmbH, 2014.

*Primary Examiner* — Michael A Laflame, Jr.
(74) *Attorney, Agent, or Firm* — Burris Law, PLLC

(57) ABSTRACT

An apparatus for the additive manufacturing of three-dimensional structures from a material that is to be solidified by way of location-selective solidification thereof as a result of light-induced chemical and/or physical processes in the material includes a laser source for producing a laser beam, a focusing optical unit for focusing the laser beam so as to form a laser focus, and a beam-splitter optical unit for splitting the laser beam into at least two partial laser beams. The laser source, the focusing optical unit and the beam-splitter optical unit are arranged such that the laser beam, starting from the laser source, passes first through the focusing optical unit and then through the beam-splitter optical unit and the partial laser beams finally are each directed to different locations on the material that is to be solidified.

17 Claims, 3 Drawing Sheets

Figure 1:
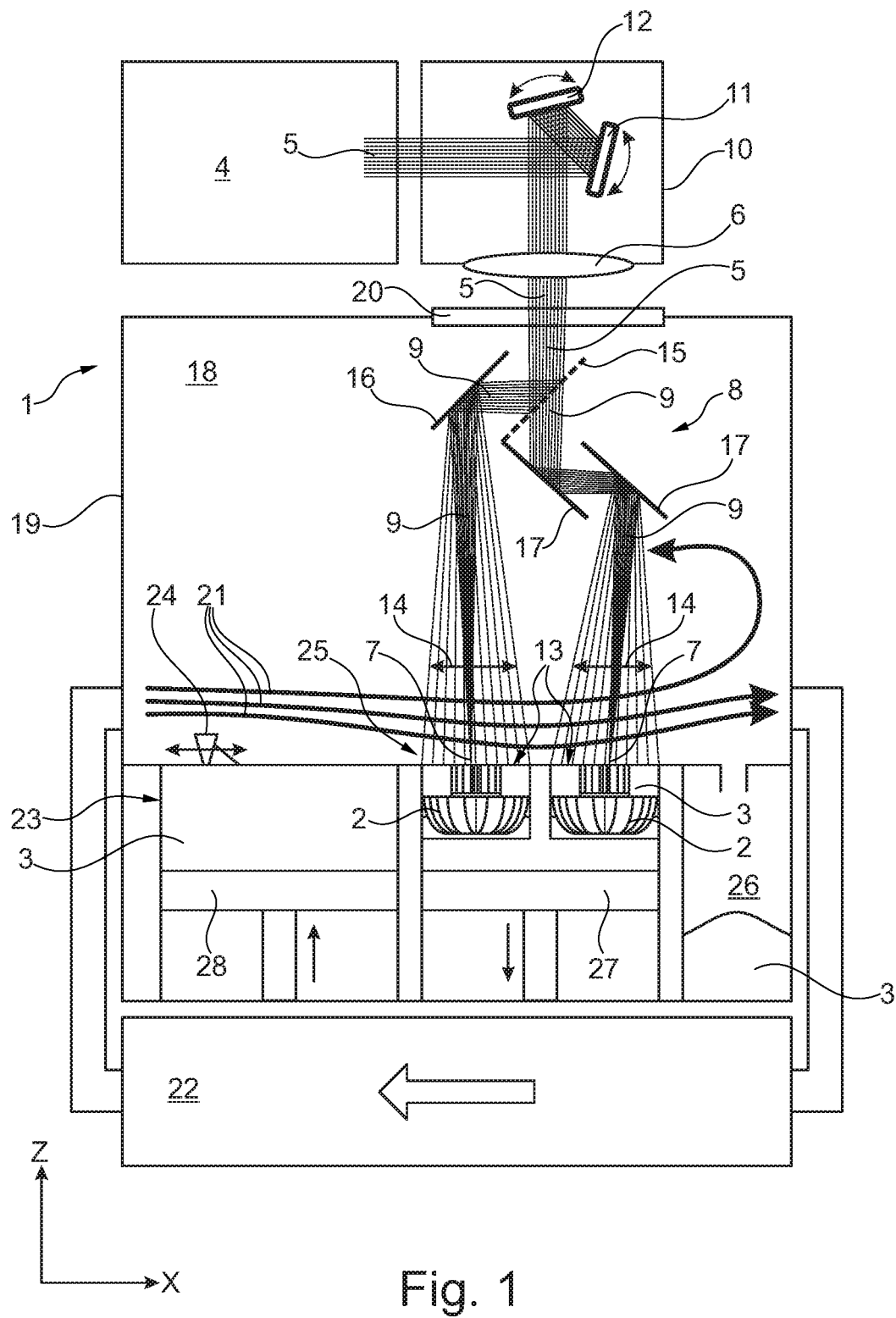

(51) Int. Cl.
  *B33Y 30/00*      (2015.01)
  *B22F 12/00*      (2021.01)
  *C04B 35/622*     (2006.01)
  *B29C 64/153*     (2017.01)
  *B22F 10/10*      (2021.01)
  *B29C 64/268*     (2017.01)
  *C04B 35/64*      (2006.01)

(52) U.S. Cl.
  CPC ......... *B22F 2201/10* (2013.01); *B29C 64/268* (2017.08); *B33Y 30/00* (2014.12); *C04B 35/64* (2013.01); *C04B 2235/6026* (2013.01); *C04B 2235/665* (2013.01)

(56) References Cited

U.S. PATENT DOCUMENTS

| | | | |
|---|---|---|---|
| 2016/0067780 A1* | 3/2016 | Zediker | B23K 26/0608 219/76.12 |
| 2016/0184925 A1* | 6/2016 | Huang | B23K 26/342 419/53 |
| 2016/0288254 A1* | 10/2016 | Pettit | B23K 26/0823 |
| 2016/0303806 A1 | 10/2016 | Mercelis | |
| 2017/0113303 A1 | 4/2017 | Rockstroh et al. | |
| 2018/0185960 A1* | 7/2018 | Coskun | B23K 26/0608 |

FOREIGN PATENT DOCUMENTS

| | | |
|---|---|---|
| DE | 19853979 | 5/2000 |
| DE | 102016107052 | 6/2017 |
| WO | 2016184888 | 11/2016 |

\* cited by examiner

APPARATUS AND METHOD FOR THE ADDITIVE MANUFACTURING OF THREE-DIMENSIONAL STRUCTURES

CROSS-REFERENCE TO RELATED APPLICATIONS

This application claims priority to and the benefit of German Application No. 102018201901.0, filed on Feb. 7, 2018. The disclosure of the above application is incorporated herein by reference.

FIELD

The present disclosure relates to an apparatus for the additive manufacturing of three-dimensional structures and to a method for the additive manufacturing of three-dimensional structures.

BACKGROUND

The statements in this section merely provide background information related to the present disclosure and may not constitute prior art.

Various apparatuses and methods are available today with which, on the basis of construction data (e.g. CAD data), three-dimensional structures, such as models, patterns, prototypes, tools, finished products and the like can be produced from shapeless or shape-neutral materials such as powders (possibly with the addition of a binder) or liquids (which sometimes also includes molten solids). These methods are also known under collective terms such as "Rapid Prototyping," "Rapid Manufacturing" or "Rapid Tooling." In this respect, a primary shaping step is often carried out in a corresponding manufacturing apparatus, in which the starting material is either present in liquid form from the outset or is liquefied in the meantime and cures at an intended location. One known method in this case is so-called fused filament fabrication (FFF), in which a workpiece is built in layers from thermoplastic material. The plastics material is, for example, supplied in the form of a powder or a strand, is molten and applied in molten form by a printing head, which successively applies individual, generally horizontal layers of the structure to be produced.

Also known are apparatuses and methods in which a pulverulent material, for example, a plastics material, is applied in layers and selectively cured by way of a locally applied or printed-on binder. In yet other methods, such as selective laser sintering (SLS), a powder is applied, for example, using a doctor blade, in layers to a base plate. The powder is selectively heated by way of suitable focused radiation, for example a focused laser beam, and thereby sintered. After a layer has been built, the base plate is lowered slightly and a new layer is applied. Plastics materials, ceramics or metals can be used here as the powder. The non-sintered powder must be removed after the production process. In a similar method, selective laser melting (SLM), the amount of energy introduced into the powder by way of the laser radiation is so high that the powder is regionally molten and solidifies into a contiguous solid body. This method is used in particular in the case of metallic powders.

Methods cited above are generally also referred to as generative or additive manufacturing methods.

U.S. Publication 2013/0056910 A1 discloses an apparatus and a method for the generative production of three-dimensional structures from an organo-polysiloxane-containing, liquid material that is to be solidified, wherein the apparatus includes a locationally fixed laser source, at least one locationally fixed deflection mirror and a focusing optical unit. The laser beam produced by the laser source is guided onto the deflection mirror, deflected thereby out of its initial direction and subsequently guided to the focusing optical unit, which focuses the laser beam at a predeterminable location in the material that is to be solidified in order to cure said material at said location and in this way build the desired three-dimensional structure in layers. To increase the manufacturing efficiency and to shorten production times, provision is made for the apparatus to include two deflection mirrors that are arranged in series, wherein, starting from the laser source, the deflection mirror that is irradiated first by the laser beam is a partially transmissive mirror (also referred to as a beam-splitting mirror), splitting the initial laser beam into two partial laser beams, wherein the deflected (reflected) first partial laser beam is guided to a first focusing optical unit that is assigned thereto and the second partial laser beam, which passes through the partially transmissive deflection mirror, is guided onto the second deflection mirror, which guides it, likewise by way of deflection, onto a second focusing optical unit that is assigned to the second partial laser beam. Using the two partial laser beams and the focusing optical units that are assigned thereto, it is possible to simultaneously create two identical three-dimensional structures in one work process.

U.S. Publication 2017/0113303 A1 likewise discloses an apparatus for the generative production of three-dimensional structures from a pulverulent material that is to be solidified, wherein a laser beam produced by a laser source is initially split by a beam-splitter optical unit into a plurality of partial laser beams, each of said partial beams is guided to one separate focusing optical unit each, and the plurality of partial laser beams are subsequently guided to a single galvanometer scanner, which finally directs the partial laser beams to different positions in the pulverulent material to melt it at the respective irradiated locations. In this way it is possible to simultaneously build a plurality of identical three-dimensional structures.

Further apparatuses for selective laser melting, in which a laser beam produced by a laser source is split into a plurality of partial laser beams that are subsequently guided to in each case separate scanner optical units in order to direct the partial laser beams to different positions in a material that is to be solidified, are disclosed in each case by CN 103949638 A and CN 103071797 A.

U.S. Publication 2016/0303806 A1 furthermore mentions an apparatus for the generative production of three-dimensional structures from a material that is to be solidified, in which a plurality of laser beams are guided in each case to a dedicated scanner optical unit for positioning the respective laser beam in the material that is to be solidified so as to produce in this way a three-dimensional structure at the same time using the plurality of laser beams.

Furthermore, WO 2016/184888 A1 describes a plurality of apparatuses, operated in parallel, for the generative production of three-dimensional structures from a material that is to be solidified, wherein the plurality of apparatuses are supplied by only one laser source, wherein the laser beam produced by the laser source is split using a beam-splitter optical unit into a plurality of partial laser beams which are guided in each case to the corresponding manufacturing apparatuses.

The published scientific paper "Multi-Laser Selective Laser Melting" by Andreas Wiesner and Dieter Schwarze, 8th International Conference on Photonic Technologies LANE 2014, likewise describes an apparatus for the generative production of three-dimensional structures from a material that is to be solidified, wherein proposed are, for the purposes of increasing productivity, a plurality of laser sources with a plurality of scanner optical units which are each separately assigned and are operated in parallel and at the same time.

SUMMARY

In view of the indicated prior art, the additive manufacturing of three-dimensional structures from a material that is to be solidified still offers, due to location-selective solidification thereof as a result of light-induced chemical and/or physical processes in the material, room for improvement.

The present disclosure provides an apparatus and a method for the additive manufacturing of three-dimensional structures, which permit both time-efficient and cost-effective manufacturing of the three-dimensional structures and consequently improve the production efficiency of said manufacturing. Moreover, the intention is likewise to reduce the outlay in terms of apparatus and the production costs of such a manufacturing apparatus per se for performing the manufacturing method.

It is pointed out that the features specified individually in the following description may be combined with one another in any desired technically meaningful way and disclose further forms or aspects of the present disclosure. The description, in particular in conjunction with the figures, characterizes and specifies the present disclosure further.

It should also be noted that a conjunction "and/or," which is used below and is situated between two features so as to link them, should always be interpreted to mean that it is possible in a first refinement of the subject matter according to the present disclosure for only the first feature to be present, in a second refinement for only the second feature to be present, and in a third refinement for both the first and the second feature to be present.

The present disclosure makes available both an apparatus and a method for the additive manufacturing of three-dimensional structures. The apparatus and the method can be assigned to the field of rapid prototyping or rapid manufacturing. However, as will be made clear below, they are suitable not only for manufacturing prototypes or individual models, but in particular also for efficient series manufacturing.

According to the present disclosure, an apparatus for the additive manufacturing of three-dimensional structures from a material that is to be solidified by way of location-selective solidification thereof as a result of light-induced chemical and/or physical processes in the material has at least one laser source for producing a laser beam, a focusing optical unit for focusing the laser beam so as to form a laser focus, and a beam-splitter optical unit for dividing the laser beam into at least two partial laser beams.

For example, a metallic powder can be used as the material that is to be solidified, wherein the solidification of the initially shapeless metal powder for additively shaping the three-dimensional structure can be effected by regionally light-induced melting and subsequent solidification of the molten material. A metallic powder as it is denoted here is any pulverulent or particulate material comprising at least one metal. It can alternatively be an alloy or a mixture of particles of different metals. The powder can also contain metalloids or nonmetals, for example as part of an alloy. Suitable metals are, among others, aluminum, titanium and iron. The additive manufacturing method carried out in this way using the apparatus according to the present disclosure can in this case be referred to as "selective laser melting" (SLM).

It should be understood that the present disclosure is not limited to the use of a metal-containing material powder, but very generally is suitable for the use of shapeless (e.g. pulverulent or liquid) or shape-neutral (e.g. tape-shaped or strand-shaped) plastics or ceramics materials, even if the text below primarily makes reference to selective laser melting using metal-containing material powders. The additive manufacturing process per se for building a three-dimensional structure in layers from a material that is to be solidified by light-induced chemical and/or physical processes is well known, such that a detailed description in this respect is omitted here.

The only point of note is that the laser beam or the partial laser beams act/acts on the material that is to be solidified as part of targeted manufacturing in a location-selective manner usually in accordance with a specific pattern, that is to say a surface that has been predetermined (also referred to as building surface) is irradiated. In this case, said surface is for example scanned by the (partial) laser beam which has been narrowly focused using the focusing optical unit, that is to say the laser focus is set by the focusing optical unit such that it is situated, for the location-selective solidification of the material, substantially in the building surface. Various scanning patterns are conceivable, for example it is possible to initially travel along the contour of a surface and then across the interior thereof, or vice versa. It is to be understood that the spatial and temporal radiation patterns of the laser beam can be controlled in accordance with specified data (e.g. CAD/CAM data) of a three-dimensional structure to be produced. The irradiated surface here corresponds to a (generally planar) cross section of the three-dimensional structure.

According to the present disclosure, the laser source, the focusing optical unit and the beam-splitter optical unit of the apparatus are arranged such that the laser beam, starting from the laser source, passes first through the focusing optical unit and then through the beam-splitter optical unit and that the partial laser beams which are produced by the beam-splitter optical unit finally are directed each to different locations on the material that is to be solidified. Consequently, the apparatus according to the present disclosure permits the simultaneous manufacturing of a plurality of three-dimensional structures with a single laser source, with one structure each being manufactured using one partial laser beam. In particular when expensive laser sources, for example fiber lasers, are used, the production costs for such an apparatus can be significantly reduced as compared to apparatuses having a plurality of laser sources. Furthermore, the apparatus according to the present disclosure permits a significant increase in productivity, because now a plurality of three-dimensional structures can be manufactured in parallel merely in dependence on the number of the partial laser beams that are produced. This further results in a significant reduction of the unit price of the production of the three-dimensional structures.

Since the focusing optical unit is arranged in the beam path of the laser beam, starting from the laser source, upstream of the beam-splitter optical unit, only a single focusing optical unit is desired to form the laser focus in the laser beam or, after it has passed through the beam-splitter optical unit, in the plurality of partial laser beams, as a result of which the construction of the apparatus according to the present disclosure can be simplified and the production costs thereof can be further reduced.

The beam-splitter optical unit is preferably adapted and configured such that it produces partial laser beams each having the same power. In one example of splitting the laser beam produced by the laser source into two partial laser beams, both partial laser beams correspondingly preferably have 50% of the power of the original overall laser beam, and accordingly in the case of an example of splitting it into four partial laser beams, they each have 25%.

It should be understood that the initial power of the laser source should be appropriately adapted to the desired or necessary power of the individual partial laser beams that are used to manufacture the three-dimensional structures. For example, if each partial laser beam is to have a power of 400 W and the beam-splitter optical unit effects splitting of the laser beam produced by the laser source into two partial laser beams, accordingly a laser source having an initial power of 800 W should be provided.

The spatial orientation of the partial laser beams for producing the scanning pattern desired for the respective layer in the building surface of the respective three-dimensional structure is advantageously effected in the apparatus according to the present disclosure by spatially orienting the laser beam produced by the laser source. This can be accomplished in principle by moving the laser source itself.

However, provided in accordance with a particularly advantageous form of the present disclosure is a scanner optical unit for spatially deflecting the laser beam produced by the laser source, wherein the scanner optical unit is arranged in the beam path of the laser beam between the laser source and the focusing optical unit. That is to say that the laser beam produced by the laser source first passes through the scanner optical unit in order to then be guided to the focusing optical unit and finally to the beam-splitter optical unit. The spatial deflection of the laser beam is here performed such that the desired location-selective solidification of the material that is to be solidified of the layer that is currently being produced of the three-dimensional structure in the building surface is effected. The laser source itself can consequently be arranged in a locationally fixed manner. In accordance with the spatial orientation of the laser beam by the scanner optical unit, an orientation of all the partial laser beams is automatically effected due to the arrangement of laser source, focusing optical unit and beam-splitter optical unit of the apparatus according to the present disclosure, which significantly simplifies the construction of the apparatus and considerably reduces the outlay in terms of control thereof, since only the laser beam produced by the laser source is manipulated by way of a single scanner optical unit.

The scanner optical unit preferably has at least one movable, in particular tiltable, optical element, for example in the form of an optical prism or a mirror. In order to be able to scan a surface, in particular the already mentioned building surface of the three-dimensional structure that is to be manufactured, it is preferred for the scanner optical unit to have at least two movable/tiltable optical elements (e.g. prisms and/or mirrors), with the result that the laser beam is deflectable both in a first spatial x-direction and in a second spatial y-direction.

In order to always keep the laser focus substantially exactly and constantly in the building surface of the three-dimensional structure, that is to say with respect to a third spatial z-direction, despite the spatial deflection of the laser beam by the scanner optical unit, the focusing optical unit is preferably embodied as what is referred to and is generally known as an f-theta optical unit or as an f-theta lens. The latter is specifically tuned to the laser source and the specific wavelength of the laser beam produced thereby. The focusing optical unit can be arranged in a locationally fixed manner at the apparatus according to the present disclosure.

A further advantageous form of the present disclosure makes provision for the beam-splitter optical unit to have at least one partially transmissive optical element, for example in the form of an optical splitter prism or splitter mirror, for splitting the laser beam into at least two partial laser beams. In this way it is possible to realize beam splitting of the laser beam within the meaning of the present disclosure in a manner which is simple in terms of construction and cost-effective, because the partially transmissive optical element partially reflects the incident laser beam while transmitting the other part.

Furthermore, the beam-splitter optical unit according to a further form of the present disclosure can have at least one optical deflection element, for example in the form of a locationally fixed optical prism or a locationally fixed deflection mirror, for at least one change in direction of at least one of the partial laser beams. The at least one optical deflection element is arranged, with respect to the beam path of the laser beam, downstream of the partially transmissive optical element. In this way, the beam paths of the partial laser beams after splitting by the at least one partially transmissive optical element can be oriented with respect to one another (e.g. with respect to their spatial distance from one another) such that the manufacturing widths desired by each partial laser beam for manufacturing the three-dimensional structure do not overlap, while the three-dimensional structures can advantageously still be arranged compactly in order to form a particularly space-saving apparatus according to the present disclosure.

In accordance with yet another advantageous form of the present disclosure, the at least one optical deflection element is arranged and oriented such that all partial laser beams produced by the beam-splitter optical unit travel the same path length starting from the partially transmissive optical element up to the point of incidence on the material to be solidified, that is to say up to the building surface of the respective layer that is to be solidified of the three-dimensional structure. Since splitting the laser beam that is incident in the beam-splitter optical unit by way of the partially transmissive optical element can result in different path lengths of the split partial laser beams starting from the partially transmissive optical element up to the solidification location of the material that is to be solidified, that is to say up to the building surface of the layer that is to be produced in each case of the three-dimensional structure, and thus in a displacement of the laser focus of one or more partial laser beams out of the building surface, it is possible using the additionally provided optical deflection element or deflection elements to provide an identical path length for all partial laser beams and thus an exact position of each laser focus per partial laser beam within the building surface of the three-dimensional structure to be manufactured. In this way, importantly, the quality of the three-dimensional structure that is to be manufactured is increased.

Disclosed in accordance with a further aspect of the present disclosure is a method for additive manufacturing of three-dimensional structures from a material that is to be solidified by way of location-selective solidification thereof as a result of light-induced chemical and/or physical processes in the material, wherein the material is irradiated by a laser beam produced by a laser source, the laser beam is guided, starting from the laser source, first to a focusing optical unit for focusing the laser beam to form a laser focus and subsequently through a beam-splitter optical unit for splitting the laser beam into at least two partial laser beams which finally are directed in each case to different locations on the material that is to be solidified.

With respect to definitions of method-related terms and the effects and advantages of method features, reference is made to the above explanations of corresponding definitions, effects and advantages with respect to the apparatus according to the present disclosure. Disclosures in this document with respect to the apparatus according to the present disclosure are intended to be correspondingly applicable also for the definition of the method according to the present disclosure, unless this is expressly excluded. Disclosures in this document with respect to the method according to the present disclosure are likewise intended to be correspondingly applicable for the definition of the apparatus according to the present disclosure, unless this is likewise expressly excluded. To this extent, repetitions of explanations of analogous features, the effects and the advantages thereof with respect to the apparatus according to the present disclosure, which has been disclosed herein, and the method according to the present disclosure, which has been disclosed herein, are dispensed with herein for the sake of a more compact description.

An advantageous form of the present disclosure makes provision for the laser beam to be spatially deflected by way of a scanner optical unit arranged in the beam path of the laser beam between the laser source and the focusing optical unit.

Furthermore, in accordance with a further advantageous form of the present disclosure, the laser beam that has been guided to the beam-splitter optical unit is split by way of at least one partially transmissive optical element into at least two partial laser beams.

Yet a further advantageous form of the present disclosure makes provision for at least one of the partial laser beams produced by the beam-splitter optical unit to be deflected at least once in terms of its direction using at least one optical deflection element before it is incident on the material that is to be solidified.

In yet a further advantageous form of the present disclosure, it is preferred if at least one of the partial laser beams is deflected at least once in terms of its direction such that all partial laser beams produced by the beam-splitter optical unit travel the same path length starting from the at least one partially transmissive optical element up to the point of incidence on the material that is to be solidified.

Further areas of applicability will become apparent from the description provided herein. It should be understood that the description and specific examples are intended for purposes of illustration only and are not intended to limit the scope of the present disclosure.

DRAWINGS

Figure 2:
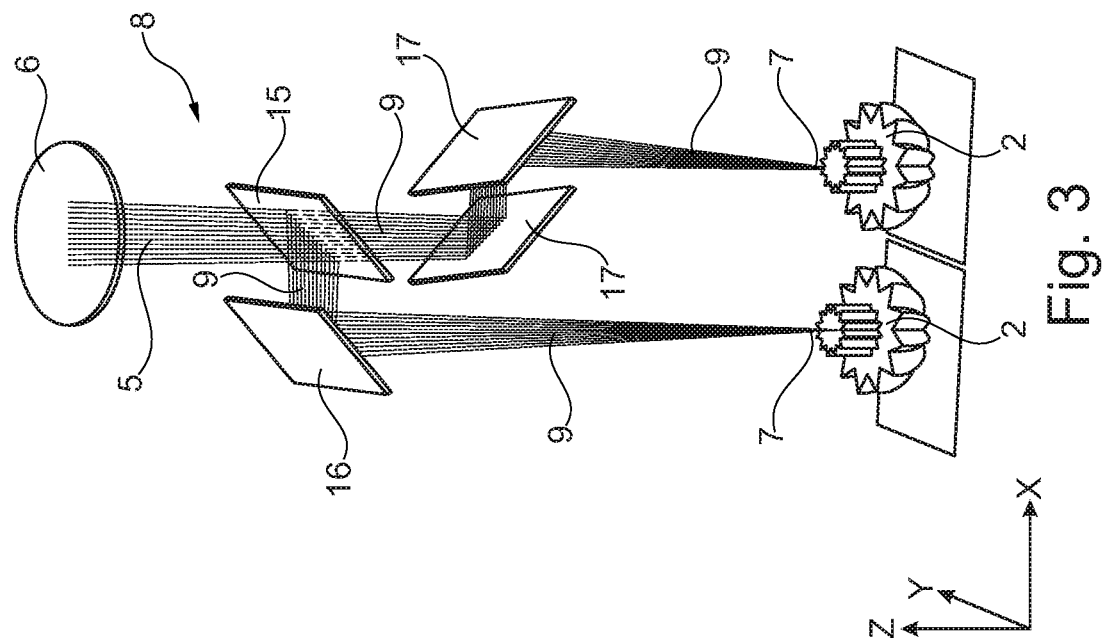
Figure 3:
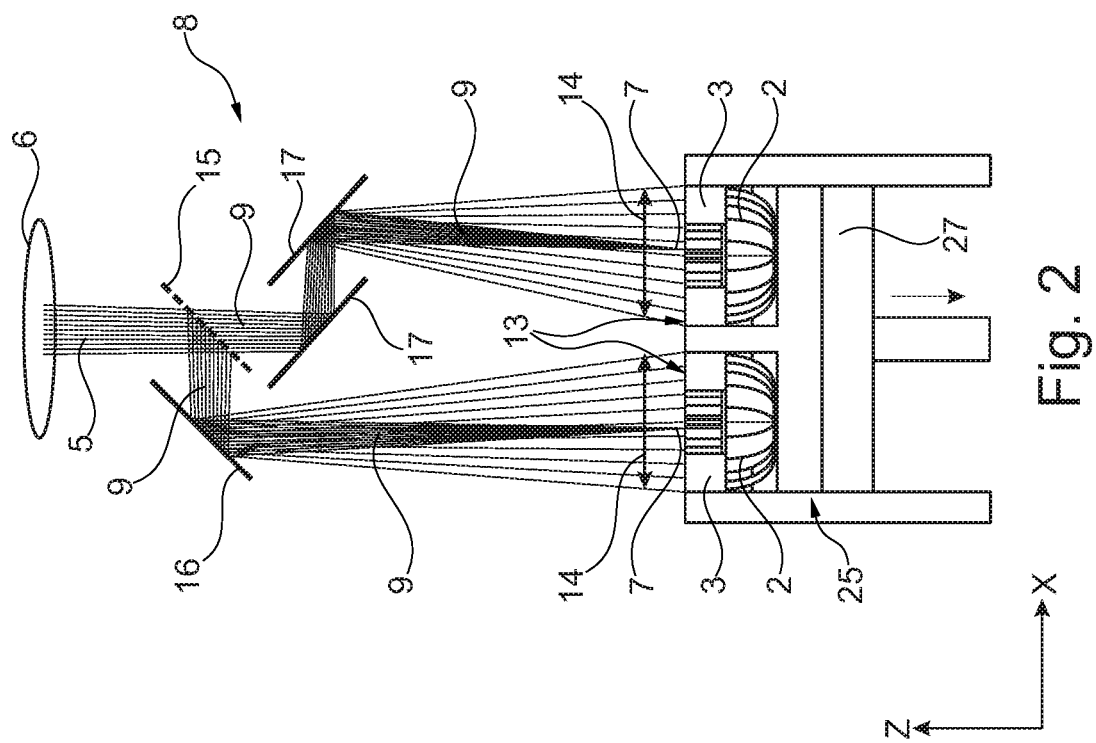
Figure 4:
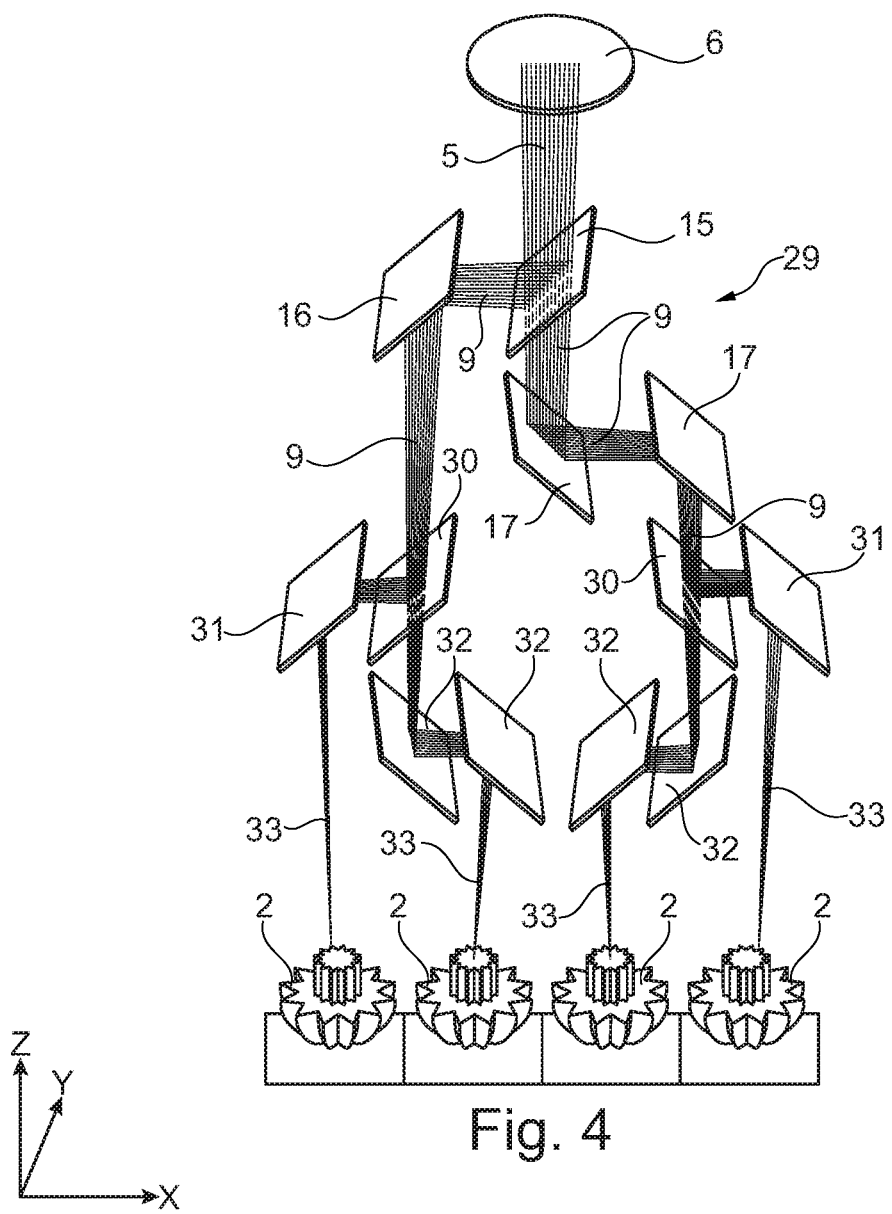
Figure 5:
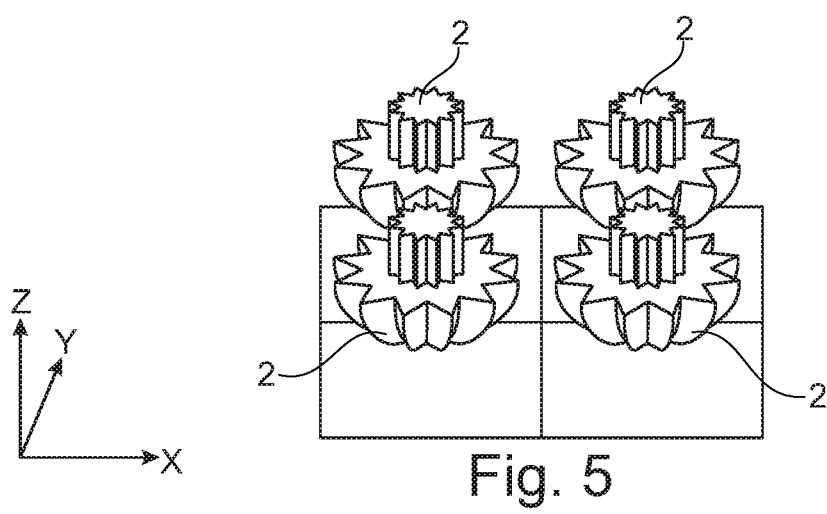

In order that the disclosure may be well understood, there will now be described various forms thereof, given by way of example, reference being made to the accompanying drawings, in which:

FIG. 1 schematically shows a lateral cross-sectional view of an exemplary form of an apparatus according to the teachings of the present disclosure, FIG. 2 schematically shows a lateral view of part of the apparatus from FIG. 1, FIG. 3 schematically shows an isometric view of the part from FIG. 2, FIG. 4 schematically shows an isometric view of part of a further exemplary form of an apparatus according to the teachings of the present disclosure, and FIG. 5 schematically shows an isometric view of part of yet a further exemplary form of an apparatus according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 schematically illustrates a lateral cross-sectional view of an exemplary form of an apparatus 1 according to the present disclosure. The apparatus 1 is used for the additive manufacturing of three-dimensional structures 2 (in the example shown here a first and a second separate yet identical structure 2) from a material 3 that is to be solidified by way of location-selective solidification thereof as a result of light-induced chemical and/or physical processes in the material 3. The material 3 that is to be solidified in the exemplary form shown in FIG. 1 is a metal-containing material powder.

As is further shown in FIG. 1, the apparatus 1 has a laser source 4, for example a fiber laser, for producing a laser beam 5, in particular a substantially non-focused laser beam 5, a focusing optical unit 6, for example an f-theta optical unit, for focusing the laser beam 5 to form a laser focus 7, and a beam-splitter optical unit 8 for splitting the laser beam 5 into at least two partial laser beams 9. Here, the laser source 4, the focusing optical unit 6 and the beam-splitter optical unit 8 are arranged in the apparatus 1 such that the laser beam 5, starting from the laser source 4, passes first through the focusing optical unit 6 and then through the beam-splitter optical unit 8 and the partial laser beams 9 finally are each directed to different locations on the material 3 that is to be solidified.

The position of the laser focus 7 of the laser beam 5 or of the respective partial laser beams 9 can be set, for example using the focusing optical unit 6, to a path length of approximately 70 centimeters (cm) from said focusing optical unit 6. Different distances are, however, also possible.

The apparatus 1 shown in FIG. 1 furthermore has a scanner optical unit 10 for spatially deflecting the laser beam 5, wherein the scanner optical unit 10 is arranged in the beam path of the laser beam 5 between the laser source 4 and the focusing optical unit 6. As is illustrated in FIG. 1, the scanner optical unit 10 has two mirrors 11 and 12, which are tiltable about different spatial axes, for example about a spatial x-axis and about a spatial y-axis, which is arranged perpendicular to the spatial x-axis and the spatial z-axis (illustrated e.g. in FIG. 3). In this way, the laser beam 5 is deflectable both in the first spatial x-direction and in the second spatial y-direction, with the result that two-dimensional scanning of a building surface 13 of the three-dimensional structure 2 in the spatial x-direction and spatial y-direction of the apparatus 1 shown in FIG. 1 is possible. A scanning width 14 of the respective partial laser beams 9 in the spatial x-direction is likewise illustrated in FIG. 1.

FIG. 1 further shows that the beam-splitter optical unit 8 includes a partially transmissive optical element 15, for example a locationally fixed splitter mirror or a locationally fixed optical splitter prism, for splitting the laser beam 5 into the two partial laser beams 9. The beam-splitter optical unit 8 furthermore has a total of three further optical deflection element 16 and 17, for example in the form of locationally fixed deflection mirrors or locationally fixed optical prisms, for at least one change in direction of the respective partial laser beams 9. As can be seen, the deflection mirror 16 deflects the partial laser beam 9 (on the left in FIG. 1) that has been reflected by the partially transmissive optical element 15 in the direction of the building surface 13 of the three-dimensional first structure 2 that is to be manufactured. The two deflection mirrors 17 direct the partial laser beam 9 (on the right in FIG. 1) that has been transmitted by the partially transmissive optical element 15 to the three-dimensional second structure 2 that is to be manufactured by way of said partial laser beam 9. The deflection mirrors 16 and 17 are used both for the orientation of the respective partial laser beams 9 onto the respective building surface 13 of the structured 2 that is to be produced and for a specific spaced-apart arrangement of the two partial laser beams 9 with respect to one another, such that the building surfaces 13 of the two separate structures 2 that are to be produced do not overlap. Moreover, the two deflection mirrors 17 are likewise used to adapt the path length of the partial laser beam 9 that is on the right in FIG. 1 to the path length of the partial laser beam 9 that is on the left in FIG. 1, with the result that both partial laser beams 9 travel exactly the same path length starting from the partially transmissive optical element 15 up to the point of incidence on the material 3 that is to be solidified. This provides that the laser focus 7, which is set by the focusing optical unit 6, of both partial laser beams 9 is situated exactly in the building surface 13 of the structures 2 so that the material 3 to be solidified, here the metal-containing powder, can melt in a location-selective fashion and subsequently solidify in order to, in this way, produce a layer of the two three-dimensional structures 2, which are to be manufactured at the same time, by way of the respective partial laser beam 9.

In the apparatus 1 illustrated in FIG. 1, a manufacturing space 18, in which the plurality of three-dimensional structures 2 are produced, is substantially hermetically sealed from the environment by way of a corresponding housing 19. The laser source 4, the scanner optical unit 10 and the focusing optical unit 6 are arranged outside said manufacturing space 18, while the beam-splitter optical unit 8 is arranged inside it. However, this arrangement is not absolutely necessary.

As can be seen in FIG. 1, the laser beam 5, which has been deflected by the scanner optical unit 10 and focused by the focusing optical unit 6, is radiated, after passing through the focusing optical unit 6, through a correspondingly designed optical window 20, which allows the laser beam 5 to pass substantially without obstruction or change, into the manufacturing space 18, where it is incident on the beam-splitter optical unit 8.

The hermetic seal of the manufacturing space 18 in the apparatus illustrated in FIG. 1 is used to provide the space 18, during the manufacturing of the three-dimensional structures 2, with an inert gas atmosphere or with an atmosphere which is enriched with inert gas 21 and has a significantly lower oxygen content as compared to conventional air, as a result of which oxidation or even burning or explosion of the metallic powder 3 can be prevented. The inert gas 21 in the apparatus 1 is continuously circulated through the manufacturing space 18 using a pump and inert gas filter apparatus 22. Overall, it is possible with these measures to improve the operational reliability of the apparatus 1 and the quality of the manufactured structures 2.

FIG. 1 furthermore shows that the pulverulent material 3 is transferred in layers from a reserve region 23 into a manufacturing region 25, in which the three-dimensional structures 2 are built in a known manner in layers in the building surface 13, using for example a doctor blade 24 or a blade or the like, and is smoothed in the manufacturing region 25. Excess material 3 can here be received in a capture region 26 and kept until later use.

After a layer of the two three-dimensional structures 2 shown in FIG. 1 has been built, a base plate 27, on which the structures 2 are built, is lowered substantially by the thickness of the previously manufactured layer, as is illustrated in FIG. 1. The layer thicknesses can, for example, be between 10 μm and 500 μm. However, different layer thicknesses are also conceivable. For resupplying further material 3 from the reserve region 23, a bottom plate 28 of the reserve region 23 can be raised accordingly, as is likewise illustrated in FIG. 1, to arrange, using the doctor blade 24, new material 3 in the building surface 13 of the three-dimensional structures 2 so as to build a next layer.

FIG. 2 shows a lateral view of part of the apparatus 1 from FIG. 1. The illustration of FIG. 2 in particular includes the focusing optical unit 6, the beam-splitter optical unit 8 including the partially transmissive optical element 15 and the deflection mirrors 16, 17, and the manufacturing region 25, in which the two three-dimensional structures 2 are formed in each case in layers in the building surface 13 by way of the two partial laser beams 9.

FIG. 3 shows an isometric view of the part from FIG. 2.

FIG. 4 shows an isometric view of part of a further exemplary form of an apparatus according to the present disclosure (not illustrated in more detail in FIG. 4). The part of the apparatus that is illustrated in FIG. 4 differs from the part that is illustrated in FIG. 3 of the apparatus 1 from FIG. 1 substantially only in that a beam-splitter optical unit 29 in FIG. 4 has, in addition to the partially transmissive optical element 15 and the deflection mirror 16 and the two deflection mirrors 17, two further partially transmissive optical elements 30. For example, each of the partially transmissive optical elements 30 are in the form of a locationally fixed optical splitter prism or a locationally fixed splitter mirror, and further optical deflection elements 31, 32. Also, in each case the two partial laser beams 9 are each split into two further partial laser beams 33, that is to say a total of four partial laser beams 33. The four partial laser beams are then guided, via identical path lengths, to the three-dimensional structures 2 that are to be manufactured.

It is possible with the refinement of the beam-splitter optical unit 29 shown in FIG. 4 to manufacture a total of four three-dimensional structures 2 at the same time. As can be seen in FIG. 4, these are arranged linearly in a row (line-type 4×1 arrangement).

FIG. 5 shows an isometric view of part of yet a further exemplary form of an apparatus according to the present disclosure (not illustrated in more detail). As can be seen, and as already shown in FIG. 4, four three-dimensional structures 2 are able to be manufactured at the same time by way of this apparatus, wherein the structures 2 in FIG. 5 are arranged in a matrix-type 2×2 arrangement that is more compact as compared to the structures 2 in FIG. 4. The arrangement can be obtained for example from the beam-splitter optical unit 29 of FIG. 4 by arranging the two partially transmissive optical elements 30 in a structurally simple manner such that they are rotated by 90° about their vertical or spatial z-axis, wherein the corresponding optical deflection elements 31, on which the partial laser beam 33, which has been reflected at the partially transmissive optical elements 30, is incident, are likewise correspondingly arranged pivoted about the spatial z-axis by 90°. The respective optical deflection elements 32, on which the partial laser beam 33, which has been transmitted at the partially transmissive optical elements 30, is incident, can likewise be arranged so as to be rotated about their vertical or spatial z-axis by 90° (but here in the opposite direction to the partially transmissive elements 30), and the optical deflection elements 32, which are situated downstream thereof, are likewise correspondingly arranged so as to be pivoted about the spatial z-axis by 90°, with the result that, overall, the compact matrix-type 2×2 arrangement of the structures 2, illustrated in FIG. 5, is obtained.

The above-described apparatus according to the present disclosure and the method according to the present disclosure for the additive manufacturing of three-dimensional structures from a material that is to be solidified by way of location-selective solidification thereof as a result of light-induced chemical and/or physical processes in the material are not limited to the forms and/or aspects disclosed herein, but also comprise in each case further forms and/or aspects of equal effect, which can be obtained from technically meaningful further combinations of the features of the apparatus or of the method described herein.

The apparatus and method according to the teachings of the present disclosure are used for the additive manufacturing of three-dimensional structures from a material that is to be solidified by way of location-selective solidification thereof as a result of light-induced chemical and/or physical processes in the material.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for the additive manufacturing of three-dimensional structures from a material that is to be solidified by way of location-selective solidification thereof as a result of light-induced chemical and/or physical processes in the material, the apparatus comprising:
    a laser source for producing a laser beam;
    a focusing optical unit for focusing the laser beam so as to form a laser focus; and
    a beam-splitter optical unit configured to split the laser beam into at least two partial laser beams, wherein the laser source, the focusing optical unit and the beam-splitter optical unit are arranged such that the laser beam, starting from the laser source, passes first through the focusing optical unit and then through the beam-splitter optical unit and the partial laser beams are each directed to different locations on the material that is to be solidified.

2. The apparatus according to claim 1 further comprising a scanner optical unit for spatially deflecting the laser beam produced by the laser source, wherein the scanner optical unit is arranged in a beam path of the laser beam between the laser source and the focusing optical unit.

3. The apparatus according to claim 1, wherein the beam-splitter optical unit has at least one partially transmissive optical element for splitting the laser beam into at least two partial laser beams.

4. The apparatus according to claim 3, wherein the beam-splitter optical unit has at least one optical deflection element for at least one change in direction of at least one of the partial laser beams.

5. The apparatus according to claim 4, wherein the at least one optical deflection element is arranged and oriented such that all partial laser beams produced by the beam-splitter optical unit travel the same path length starting from the at least one partially transmissive optical element to a point of incidence on the material to be solidified.

6. A method for the additive manufacturing of three-dimensional structures from a material that is to be solidified by way of location-selective solidification thereof as a result of light-induced chemical and/or physical processes in the material, the method comprising:
    irradiating the material with a laser beam produced by an apparatus comprising:
    a laser source for producing the laser beam;
    a focusing optical unit for focusing the laser beam so as to form a laser focus; and
    a beam-splitter optical unit configured to split the laser beam into at least two partial laser beams, wherein the laser source, the focusing optical unit and the beam-splitter optical unit are arranged such that the laser beam, starting from the laser source, passes first through the focusing optical unit and then through the beam-splitter optical unit and the partial laser beams are each directed to different locations on the material that is to be solidified,
    wherein the laser beam is guided starting from the laser source first to the focusing optical unit for focusing the laser beam to form the laser focus and is subsequently guided through the beam-splitter optical unit for splitting the laser beam into the at least two partial laser beams, which are finally directed in each case to the different locations on the material that is to be solidified.

7. The method according to claim 6, wherein the laser beam produced by the laser source is spatially deflected by way of a scanner optical unit arranged in a beam path of the laser beam between the laser source and the focusing optical unit.

8. The method according to claim 6, wherein the laser beam that has been guided to the beam-splitter optical unit is split into at the least two partial laser beams using at least one partially transmissive optical element.

9. The method according to claim 6, wherein at least one of the at least two partial laser beams produced by the beam-splitter optical unit is deflected at least once in terms of its direction using at least one optical deflection element before it is incident on the material that is to be solidified.

10. The method according to claim 6, wherein the at least two partial laser beams are deflected at least once in terms of their directions such that all partial laser beams produced by the beam-splitter optical unit travel the same path length starting from the at least one partially transmissive optical element to points of incidence on the material to be solidified.

11. An apparatus for the additive manufacturing of three-dimensional structures from a material that is to be solidified by way of location-selective solidification thereof as a result of light-induced chemical and/or physical processes in the material, the apparatus comprising:

a laser source for producing a laser beam;

a focusing optical unit for focusing the laser beam so as to form a laser focus;

a beam-splitter optical unit configured to split the laser beam into at least two partial laser beams, wherein the laser source, the focusing optical unit and the beam-splitter optical unit are arranged such that the laser beam, starting from the laser source, passes first through the focusing optical unit and then through the beam-splitter optical unit and the partial laser beams are each directed to different locations on the material that is to be solidified; and a scanner optical unit for spatially deflecting the laser beam produced by the laser source, wherein the scanner optical unit is arranged in a beam path of the laser beam between the laser source and the focusing optical unit.

12. The apparatus according to claim 11, wherein the beam-splitter optical unit has at least one partially transmissive optical element for splitting the laser beam into the at least two partial laser beams.

13. The apparatus according to claim 12, wherein the at least one partially transmissive optical element is at least one of a locationally fixed splitter mirror and a locationally fixed optical splitter prism.

14. The apparatus according to claim 11, wherein the beam-splitter optical unit has at least one optical deflection element for at least one change in direction of at least one of the partial laser beams.

15. The apparatus according to claim 14, wherein the at least one optical deflection element is arranged and oriented such that all partial laser beams produced by the beam-splitter optical unit travel the same path length starting from the at least one partially transmissive optical element to points of incidence on the material to be solidified.

16. The apparatus according to claim 11, wherein the beam splitter optical unit has at least three partially transmissive optical elements for splitting the laser beam into at least four partial laser beams.

17. The apparatus according to claim 16, wherein each of the at least three partially transmissive optical elements is at least one of a locationally fixed splitter mirror and a locationally fixed optical splitter prism.

* * * * *